May 2, 1967          E. W. YOTT          3,317,808

VARIABLE SPEED MOTOR CONTROL MECHANISM

Filed Feb. 24, 1964

INVENTOR.
EDWARD W. YOTT
BY
*W. E. Finke*
HIS ATTORNEY

# United States Patent Office 3,317,808
Patented May 2, 1967

3,317,808
VARIABLE SPEED MOTOR CONTROL
MECHANISM
Edward W. Yott, St. Clair Shores, Mich., assignor to General Motors Corporation, Detroit, Mich., a corporation of Delaware
Filed Feb. 24, 1964, Ser. No. 346,895
6 Claims. (Cl. 318—346)

This invention pertains to electric motors, and particularly to a variable speed controlled direct current motor.

Heretofore, blower motors for automotive heating and air conditioning systems have been operable at a plurality of predetermined speed settings, such as high, medium and low. Since automotive blower motors are ordinarily of the direct current series wound type, multiple speed selection has been accomplished by connecting different resistors in the armature circuit. The present invention relates to infinitely variable speed control mechanism for an automotive blower motor wherein the resistance of the armature circuit is controlled through a cam actuated breaker point assembly such that the operator can select any speed within the range between predetermined minimum and maximum motor speeds.

Accordingly, among my objects are the provision of means for infinitely varying the speed of a motor between predetermined minimum and maximum speeds; the further provision of an infinitely variable speed control for a direct current motor including a resistor and motor driven cam actuated switch means for connecting and disconnecting the resistor in circuit with the motor; and the still further provision of infinitely variable speed control mechanism of the aforesaid type including manual means for adjusting the dwell time of the cam notched switch means.

The aforementioned and other objects are accomplished in the present invention by connecting a resistor and a set of breaker points in parallel relation, and connecting this assembly in series with the armature circuit of a series wound direct current motor. One of the breaker points is actuated by a cam during each revolution of the armature shaft, and the other breaker point is manually adjustable to control the dwell time of the breaker points. In this manner the average current in the armature and series field winding circuit of the motor can be controlled so as to enable motor speed to be infinitely varied between predetermined minimum and maximum speeds.

Further objects and advantages of the present invention will be apparent from the following description, reference being had to the accompanying drawings, wherein a preferred embodiment of the present invention is clearly shown.

Figure 1:
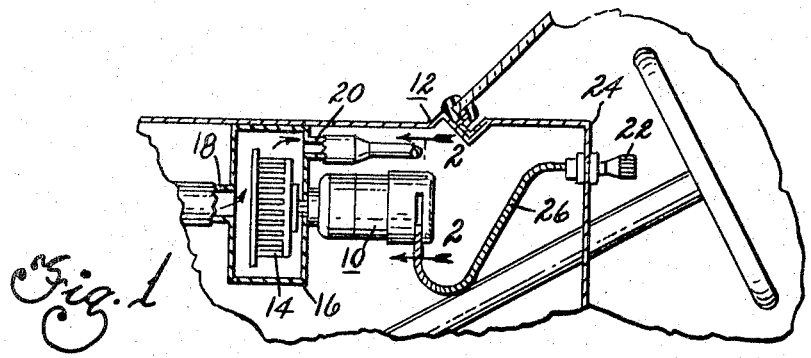
FIGURE 1 is a fragmentary view, partly in section and partly in elevation, of a typical blower motor installation in a vehicle.

Referring to FIGURE 1, a direct current automotive motor 10 is shown suitably mounted within a vehicle 12. The motor 10 drives a squirrel cage blower wheel 14 disposed in a blower housing 16 having an air intake at 18 and an outlet at 20. Operation of the motor 10 is controlled by a knob 22 mounted on the instrument panel 24 in the passenger compartment of the vehicle 12, the knob 22 being connected to the motor through a Bowden wire control 26.

Figure 2:
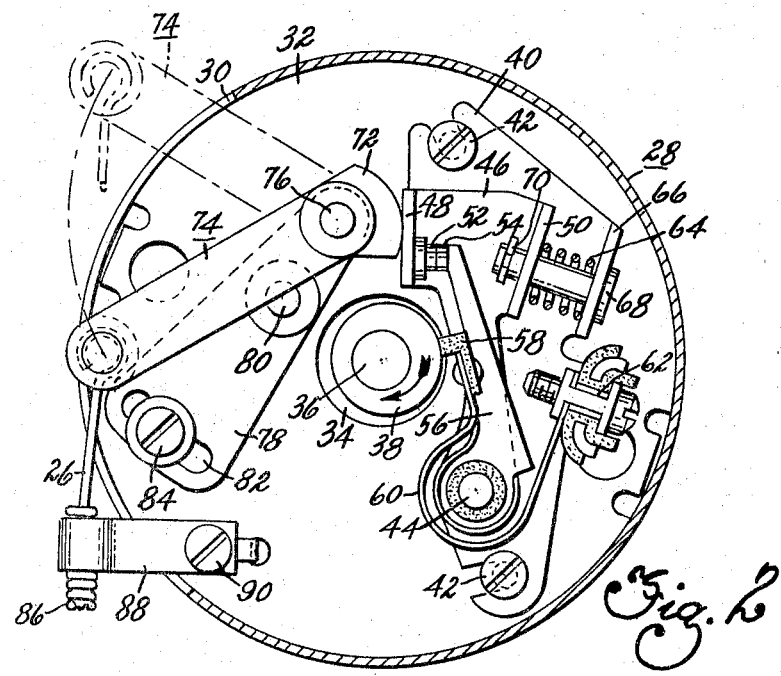
FIGURE 2 is an enlarged sectional view taken along line 2—2 of FIGURE 1.

Referring to FIGURE 2, the speed controlling mechanism for the blower motor 10 is contained within a cup-shaped housing 28 attached to the motor case. The cup-shaped housing 28 is formed with an arcuate side wall slot 30 and circumscribes a base plate 32 suitably attached to the motor case. The base plate 32 is formed with a central circular aperture 34 through which the armature shaft 36 of the motor projects. The cam, or eccentric, 38 is attached to the end of the armature shaft 36. The breaker point assembly comprises a contact supporting plate 40 attached to the base plate 32 by a pair of screws 42. The plate 40 carries an upstanding pin 44 upon which a second contact plate 46 is pivotally supported. The contact plate 46 has spaced upturned flanges 48 and 50, the flange 48 carrying a manually adjustable electrical contact 52. The contact 52 cooperates with a second electrical contact 54 carried by a breaker arm 56 that is pivotally supported on the pin 44. The breaker arm 56 carries a rubbing block, or cam follower, 58 which engages the cam 38. The follower 58 and breaker arm 56 is maintained in contact with the cam 38 by a leaf spring 60 having one end attached to the follower 58 and its opposite end attached to an upstanding lug 62 integral with the supporting plate 40.

The contact plate 46 is biased in the counterclockwise direction about the pivot pin 44 by a coil spring 64 interposed between flange 50 on the contact plate 46 and a flange 66 on the contact plate 40. The coil spring 64 encircles a headed guide pin 68 which extends through aligned openings in the flanges 50 and 66. Counterclockwise movement of the contact plate 46 under the urge of the spring 64 is limited by a retaining ring 70 attached to the guide pin 68. The flange 48 on the contact plate 46 engages a cam, or eccentric, surface 72 formed on the end of a lever 74. The lever 74 is pivotally supported on an upstanding pin 76 carried by a second lever 78. The lever 78 is pivotally supported on a pin 80 attached to the base plate 32, and is formed with an arcuate slot 82 for receiving a screw 84 having threaded engagement with the base plate 32. By loosening the screw 84, the lever 78 can be adjusted angularly about its pivot 80 to vary the position of the pivot pin 76, and hence shift the axis of pivotal movement of the lever 74. The lever 74 is connected at its other end to the Bowden wire control 26 and can be manually adjusted between the full and dotted line positions shown in FIGURE 2 so as to infinitely vary the dwell time of the breaker points, or switch contacts 52 and 54. The Bowden wire control 26 includes a conduit 86 which is fixedly attached to a clip 88 secured by a screw 90 to the base plate 32.

Figure 3:
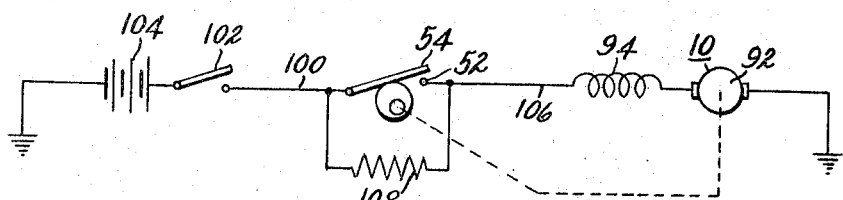
FIGURE 3 is a circuit diagram of a motor circuit.

Referring to FIGURE 3, the blower motor 10 includes a wound armature 92 and a series field winding 94. A wire 100 is connected through a manual "on" "off" switch 102 to one terminal of a battery 104, the other terminal of which is grounded. The wire 100 is connected to the breaker arm carried switch contact 54, and the switch contact 52 is connected to a wire 106 that connects with the series field winding and armature circuit of the motor. The breaker points 52 and 54 are shunted by a resistor 108.

In a typical automotive installation the normal operating potential of the blower motor is 12 volts, and the resisor 108 connected in series with the armature and series field winding circuit has a resistance of 1.2 ohms. The breaker points 52 and 54 are composed of pure silver, and by employing a low resistance the current flow resulting from the inductive load on the motor when breaker points 52 and 54 are opened will be accommodated by the resistor 108 without damage to the points 52 and 54. The predetermined minimum, or low, speed of the motor is the motor speed resulting from continuous connection of the resistor 108 in series with the armature and series field winding contact thereof. The predetermined maximum, or high, speed of the blower motor is obtained when the resistor 108 is continuously shortcircuited by the breaker points 52 and 54. Between these two predetermined speeds the motor speed can be infinitely varied by adjusting the dwell time of the breaker points 52 and 54, that is, by regulating the closed time versus the open time of the breaker points during each revolution of the armature shaft 36. This is achieved in the present invention by manual adjustment of the lever 74 to vary the position of the cam 72. The lever 74 is shown in the high speed position in full lines in FIGURE 2 at which time the breaker point is continuously maintained in contact with the breaker point 54 during rotation of the armature shaft 36 and the eccentric 38. As the lever 74 is moved towards the dotted line position shown in FIGURE 2, the closed time of the breaker points 52 and 54 during each revolution of the armature shaft decreases, and conversely the open time of the breaker points increases. In the dotted line position of the lever 74 shown in FIGURE 2, the breaker points 52 and 54 are continuously open during rotation of the armature shaft 36 and cam 38. Accordingly, upon closure of the manual switch 102 so as to complete the energizing circuit for the motor 10 the speed of the blower motor can be infinitely varied between the predetermined low and high speeds thereof by positioning the Bowden wire 26 through the knob 22 to control the average motor current.

While the embodiment of the invention as herein disclosed constitutes a preferred form, it is to be understood that other forms might be adopted.

What is claimed is as follows:

1. Speed control mechanism for a direct current motor having a motor case, an armature shaft, a speed controlling resistor connected in circuit with the motor and a pair of breaker points connected in parallel with said resistor, comprising a base plate attached to said motor case, a first contact plate secured to said base plate, a second contact plate pivotally mounted on said first contact plate and carrying one of said breaker points, a breaker arm pivotally mounted on said first contact plate and carrying the other breaker point, a first cam attached to said armature shaft, a follower attached to said breaker arm, resilient means engaging said breaker arm and urging said follower into engagement with said first cam, a second cam engageable with said second contact plate, resilient means biasing the second contact plate into engagement with said second cam, and means pivotally attached to said base plate for adjusting the position of said second cam to infinitely vary the engagement interval of said breaker points during each revolution of said armature.

2. Speed control mechanism for a direct current motor having a motor case, an armature shaft, a speed controlling resistor connected in circuit with the motor and a pair of breaker points connected in parallel with said resistor, comprising a base plate attached to said motor case, a first contact plate secured to said base plate, a second contact plate pivotally mounted on said first contact plate and carrying one of said breaker points, a breaker arm pivotally mounted on said first contact plate and carrying the other breaker point, a first cam attached to said armature shaft, a follower attached to said breaker arm, resilient means engaging said breaker arm and urging said follower into engagement with said first cam, a lever having a second cam engageable with said second contact plate, resilient means biasing the second contact plate into engagement with said second cam, and means pivotally supporting said lever for adjusting the position of said second cam to infinitely vary the engagement interval of said breaker point during each revolution of said armature.

3. Speed control mechanism for a direct current motor having a motor case, an armature shaft, a speed controlling resistor connected in circuit with the motor and a pair of breaker points connected in parallel with said resistor, comprising a base plate attached to said motor case, a first contact plate secured to said base plate, a second contact plate pivotally mounted on said first contact plate and carrying one of said breaker points, a breaker arm pivotally mounted on said first contact plate and carrying the other breaker point, a first cam attached to said armature shaft, a follower attached to said breaker arm, resilient means engaging said breaker arm and urging said follower into engagement with said first cam, a first lever pivotally mounted on said base plate and carrying an upstanding pin, a second lever pivotally mounted on said pin and having a second cam engageable with said second contact plate, resilient means biasing the second contact plate into engagement with said second cam, and remotely operated means for pivoting the second lever to adjust the position of the second cam to infinitely vary the engagement interval of said breaker points during each revolution of said armature.

4. The mechanism set forth in claim 3 wherein said first lever has an elongate slot radially spaced from its pivotal connection to said base plate, and a threaded fastener extending through said slot and engaging said base plate for securing said first lever in adjusted position, the pivotal adjustment of said first lever varying the location of the pivot axis of said second lever.

5. The mechanism set forth in claim 3 wherein said remote control means comprises a Bowden wire connected to said second lever.

6. The mechanism set forth in claim 3 wherein the pivotal support for said second contact plate and said breaker arm comprises an upstanding pin attached to said first contact plate, and wherein said second contact plate is interconnected with said first contact plate through a guide pin, and wherein said resilient means encircles said guide pin and reacts between said first and second contact plates.

References Cited by the Examiner

UNITED STATES PATENTS

| | | | |
|---|---|---|---|
| 2,398,007 | 4/1946 | Hunter | 318—349 X |
| 2,631,265 | 3/1953 | Colegrove | 318—346 |
| 2,740,080 | 3/1956 | Haydon | 318—346 X |
| 2,786,173 | 3/1957 | Martin et al. | 318—348 |
| 2,832,225 | 4/1958 | Hart. | |
| 2,895,024 | 5/1961 | Contant et al. | |

ORIS L. RADER, *Primary Examiner.*

J. C. BERENZWEIG, J. J. BAKER, *Assistant Examiners.*